United States Patent
Leutenegger et al.

(10) Patent No.: US 10,634,515 B2
(45) Date of Patent: Apr. 28, 2020

(54) APPARATUS AND METHOD FOR THE POSITION DETERMINATION OF A CYLINDER PISTON

(71) Applicant: Liebherr-Elektronik GmbH, Lindau (DE)

(72) Inventors: Paolo Leutenegger, Mochenwangen (DE); Michael Scheidt, Wetzikon (CH); Sebastian Braun, Lindau (DE); Michael Kipp, Sigmarszell (DE)

(73) Assignee: Liebherr-Elektronik GmbH, Lindau (DE)

( * ) Notice: Subject to any disclaimer, the term of this patent is extended or adjusted under 35 U.S.C. 154(b) by 673 days.

(21) Appl. No.: 15/280,645

(22) Filed: Sep. 29, 2016

(65) Prior Publication Data

US 2017/0097246 A1    Apr. 6, 2017

(30) Foreign Application Priority Data

Oct. 2, 2015 (DE) .................. 10 2015 012 799

(51) Int. Cl.
| | |
|---|---|
| *G01D 5/14* | (2006.01) |
| *G01D 5/48* | (2006.01) |
| *F15B 15/28* | (2006.01) |
| *G01S 13/88* | (2006.01) |

(52) U.S. Cl.
CPC ........... *G01D 5/14* (2013.01); *F15B 15/2815* (2013.01); *F15B 15/2869* (2013.01); *G01D 5/48* (2013.01); *G01S 13/88* (2013.01)

(58) Field of Classification Search
CPC ... F15B 15/2815; F15B 15/2869; G01D 5/14; G01D 5/48; G01S 13/88
See application file for complete search history.

(56) References Cited

U.S. PATENT DOCUMENTS

| | | | |
|---|---|---|---|
| 6,445,193 B1 | 9/2002 | Trummer et al. | |
| 2005/0205060 A1* | 9/2005 | Michelini | ................. F01L 1/36 123/432 |
| 2012/0019409 A1* | 1/2012 | Trummer | ............ F15B 15/2869 342/118 |

FOREIGN PATENT DOCUMENTS

| | | |
|---|---|---|
| DE | 19537877 A1 | 4/1996 |
| DE | 102005029494 A1 | 1/2007 |
| DE | 102008064259 A1 | 7/2010 |
| DE | 102011088381 A1 | 6/2013 |
| DE | 102013018808 A1 | 5/2015 |
| DE | 202014001604 U1 | 5/2015 |
| EP | 1040316 B1 | 10/2007 |
| EP | 2199753 A2 | 6/2010 |
| WO | 2015067378 A1 | 5/2015 |

\* cited by examiner

*Primary Examiner* — Mischita L Henson
(74) *Attorney, Agent, or Firm* — McCoy Russell LLP (57) ABSTRACT

The present disclosure relates to an apparatus for the position determination of a cylinder piston located in a cylinder liner, said apparatus comprising: a port for coupling an electrical signal into or out of the interior of the cylinder liner, wherein a signal coupled into the interior of the cylinder liner interacts with the cylinder piston. The present disclosure is characterized by a unit for determining the position of the cylinder piston which is connected to the port and which is configured to determine the position of the cylinder piston in the cylinder liner with the aid of a vectorial measurement of a signal decoupled from the cylinder liner.

15 Claims, 5 Drawing Sheets

APPARATUS AND METHOD FOR THE POSITION DETERMINATION OF A CYLINDER PISTON

CROSS REFERENCE TO RELATED APPLICATION

This application claims priority to German Patent Application No. 10 2015 012 799.3, entitled "Apparatus and Method for the Position Determination of a Cylinder Piston" filed Oct. 2, 2015, the entire contents of which is hereby incorporated by reference in its entirety for all purposes.

TECHNICAL FIELD

The present disclosure relates to an apparatus and to a method for the position determination of a cylinder piston, in particular a cylinder piston of a hydraulic or pneumatic piston-in-cylinder unit.

BACKGROUND AND SUMMARY

A position determination of a cylinder piston which is as exact and as fast as possible is used for a number of technical applications. The exact piston position is in particular required as a control variable for the automated control of a piston-in-cylinder unit. In addition, the position determination can be used to satisfy operating safety since the inlet of the hydraulic medium, in particular of the hydraulic fluid, can be exactly controlled and consequently stopped in good time in extreme positions of the cylinder piston.

A precision position determination is above all of importance in the automatic control of the piston-in-cylinder unit in construction machinery or hoisting units. The piston-in-cylinder unit actuates the piece of working equipment of the construction machine or hoisting unit in a typical manner. A sufficiently exact position determination of the piston-in-cylinder unit increases the quality of the control and is therefore absolutely necessary. One of a plurality of techniques known in the prior art for the determination of the current position of a cylinder piston is the use of specifically arranged cable line potentiometers.

An alternative method for the measurement of the longitudinal extent of the hydraulic cylinder works in accordance with a magnetorestrictive principle. In this respect, however, the piston rod has to be drilled through over the total stroke length for the integration of the measurement element into the cylinder, which weakens the cylinder mechanically and causes high integration costs. This installation variant can no longer be used with large cylinders. The required cable conduit of the measurement electronics used within the cylinder likewise represents a challenging task.

A further method for the position determination of hydraulic cylinders and pneumatic cylinders is known from DE 10 2005 029 494 A1. The piston cylinder arrangement resulting from this has a sensor element which interacts with a magnetic transmitter element. The piston takes over the function of a plunger (transmitter element) whose position is detected by a path sensor coil (sensor element) and is determined by evaluation electronics. The path sensor coil is located in the side of the cylinder liner remote from the piston rod.

DE 195 37 877 A1 discloses an apparatus for the determination of a piston position in a cylinder using electromagnetic waves in which a conclusion is drawn on the position of the piston in the cylinder with the aid of a scalar evaluation.

A further measurement principle is known from DE 10 2011 088 381 A1. The resonance measurement method used therein determines the current position of the piston on the basis of the capacitance formed and of the inductance of the piston cylinder arrangement. The measured inductance is substantially decisive as the length-changing variable. It is, however, disadvantageous in the named measurement method that sporadically occurring short-circuit effects between the piston and the jacket surface, for example due to contamination within the piston-in-cylinder unit, can falsify the measurement accuracy. A residual risk thus remains on the operation of such cylinder units.

In addition, interference effects are present in the measurement of the cylinder impedance since external unstable impedance amounts cannot be separated from the useful cylinder impedance. Such interference amounts are inter alia the external coupling means which are required for measuring the impedance. The exact positioning suffers due to this, in particular with non-constant working conditions such as fluctuating temperatures, pressure and a mechanical strain on the cylinder.

It is therefore the aim of the present disclosure to provide the skilled person with an alternative or improved and more reliable measurement method as well as a measurement apparatus corresponding thereto for the position determination of a cylinder piston.

The apparatus for the position determination of a cylinder piston located in a cylinder liner accordingly comprises a port for coupling or for decoupling an electrical signal into or out of the interior of the cylinder liner, wherein a signal coupled into the interior of the cylinder liner interacts with the cylinder piston. The apparatus is characterized by a unit for determining the position of the cylinder piston which is connected to the port and which is configured to determine the position of the cylinder piston in the cylinder liner with the aid of a vectorial measurement of a signal decoupled from the cylinder liner.

It is possible by the provision of the port to measure a measurement path comprising a cylinder liner and a cylinder piston. In this respect, an excitation signal is first coupled into the interior of the cylinder via the port and, after a propagation of the signal in the interior of the cylinder liner, the signal is decoupled from the interior of the cylinder lie via the port and is determined with the aid of a vectorial measurement. The phase of the signal is determined in addition to the amplitude value in the vectorial measurement.

The vectorial measurement of the signal allows a more accurate and faster determination of the position of the piston in the cylinder liner.

The port in this respect describes every kind of coupling element which can transmit an electrical signal inductively, capacitively or ohmically to a conductive structure.

There is advantageously a first port for coupling an electrical signal into and a second port for decoupling an electrical signal out of the cylinder liner.

On the presence of two ports, with a first port being provided for coupling an electrical signal into and a second port for decoupling an electrical signal out of the cylinder liner, the unit for determining the position of the cylinder piston is configured in an advantageous modification of the present disclosure to detect at least one scattering parameter of the port with the aid of a multi-gate measurement and to determine the cylinder piston position on the basis of the at least one detected scattering parameter. What is innovative in this respect is the consideration of the cylinder as a multi-gate system and the recognition that a position of the piston in the cylinder liner is possible using the scattering parameter.

This simplifies and accelerates the measurement of the piston position and additionally allows the implementation using components readily available on the market. The unit for determining the position of the cylinder piston can thus, for example, comprise a commercial network analyzer.

This consideration can also be used if only one port is present which both couples a signal into and decouples a signal out of the cylinder liner. A signal can, for example, simultaneously be coupled into and decoupled out of the cylinder liner over only one port. However, this produces less exact results than on the implementation with two ports separate from one another.

In accordance with a further advantageous modification of the present disclosure, the apparatus for the position determination of a cylinder piston comprises a piston rod which is connected at one of its ends to the cylinder piston; a piston rod bearing which is arranged at a section of the piston rod; a first port for coupling an electrical signal into the interior of the cylinder liner and/or onto the piston rod; and a second port for decoupling an electrical signal out of the interior of the cylinder liner and/or from the piston rod. The unit for determining the position of the cylinder piston is furthermore configured to detect at least one scattering parameter of the ports with the aid of a multi-gate measurement and to determine the cylinder piston position on the basis of the at least one detected scattering parameter.

The cylinder piston whose position is to be determined by the apparatus in accordance with the present disclosure is therefore arranged at an end of the piston rod. The piston rod bearing typically serves the support of the piston rod and terminates a cylinder jacket at one side. The cylinder piston is in this respect displaceably received in the cylinder jacket. As a rule, the piston rod bearing is arranged outside a cylinder jacket or a cylinder liner, whereas the cylinder piston is arranged movably within the cylinder jacket. In a cross-sectional view extending in the longitudinal direction of the piston rod, the cylinder piston has a greater extent than the piston rod so that a termination is achieved with the inner surface of a cylinder jacket which is exact as possible.

The surfaces of the cylinder-in-piston unit, i.e. of the complete cylinder, can in this respect also be coated with electrically non-conductive materials; however, the bulk material has to be electrically conductive so that a current can flow at all. Only one conductive layer is also sufficient for this purpose as would be the case with a plastic cylinder having a thin metal coating.

The present disclosure is inter alia based on the basic recognition that the position information of the cylinder piston can be obtained from a vectorial measurement of the scattering parameters of a cylinder. The first port in this respect represents a first gate and the second port in this respect represents a second gate which interacts with the piston rod or with the piston rod bearing. It is, however, also possible only to provide one port which can be considered as a first port in the signal output direction and as a second port in the signal reception direction. The embodiment with two ports physically separated from one another is, however, of advantage since better measurement results can be achieved.

The hollow space between the piston rod and the cylinder liner serves as a propagation space for electromagnetic waves which are used for the measurement of the piston position. The electrically conductive parts of the cylinder represent boundary conditions for electromagnetic waves.

The transmission factor $S_{21}$ or $S_{12}$ between the first and second ports thus serves, for example, as a basis for the determination of the cylinder impedance so that a conclusion can then be drawn on the exact position of the piston.

The circumstance is advantageous with the position determination on the basis of at least one scattering parameter that the impedance contributions of coupling elements such as the ports can be suppressed by a clever choice of the measurement frequency. A more exact position determination of the piston thereby results. In addition, the presented disclosure achieves more exact results under non-constant working conditions such as fluctuating temperatures, pressure and mechanical strains on the cylinder.

In accordance with an advantageous modification of the present disclosure, the at least one scattering parameter which is used for determining the piston position is a transmission factor. With a dual gate, this is the scattering parameter $S_{12}$ or $S_{21}$ which are identical in an advantageous variation of the present disclosure. Accordingly, the dual gate formed with the first port and the second port is transmission-symmetrical.

The first port and the second port are advantageously arranged in a fixed position with respect to a stroke movement of the cylinder piston and of the piston rod. An arrangement at or in the piston rod bearing is particularly advantageous. The ports can in this respect in particular be fixedly connected to a cylinder jacket in which the cylinder piston is received. The position of the port or ports with respect to the cylinder liner does not change. The unit for determining the position of the cylinder piston is then configured to determine the cylinder piston position with respect to the ports arranged in a fixed position.

The impedance of the measurement path between the cylinder piston and the cylinder liner changes through a variation of the piston position. Signal changes at the port or ports can thereby be measured which are directly related to the stroke variation of the piston.

In accordance with a further advantageous modification of the present disclosure, the first port and/or the second port is/are a coupling element which allows a transmission of an electrical signal to the piston rod or from the piston rod in a capacitive, inductive and/or ohmic manner.

In a simple embodiment, the ports comprise electrical connectors (electrodes) which are in operative connection with the piston rod so that one port respectively corresponds to one gate of the multi-gate measurement. The second connector of a port belonging to the gate is in this respect represented by a common mass level. Suitable electrical connectors are all electrical connections which allow an interaction between an external coupling and a position-variable waveguide (in the form of the piston rod here).

It is possible to integrate the electrical connectors directly in the piston rod bearing to allow a signal transmission to the piston rod of the cylinder in an inductive, capacitive or ohmic manner. A capacitive or inductive connection is advantageous since the interaction with the piston rod is thus implemented free of wear without the changes of a contact caused by the service life resulting in a deterioration of the signal transmission. A direct contact of the piston rod with the ports is, however, likewise possible.

In an advantageous modification of the present disclosure, the first port (4) and the second port (5) can thus have at least one electrical connector comprising an electrode. This electrode is then typically connected to the piston rod and provides a bidirectional signal transmission of electrical signals.

The unit for determining the position of the cylinder piston of the apparatus is configured to carry out the multi-gate measurement of the ports for determining the at least one scattering parameter at least two mutually different measurement frequencies or measurement frequency ranges. The multi-gate measurement is a dual gate measurement with only two ports.

A specific frequency which is used in the determination of the scattering parameters results in a piece of position information of the cylinder piston which is unambiguous up to a multiple of the magnitude $\lambda/2$. This multiplicity can be resolved with the help of the measurement of the scattering parameters at a further frequency and the position determination can be carried out particularly reliably. In this respect, $\lambda$ defines the wavelength and is related to the frequency through the inverse of the propagation speed of the electromagnetic wave in the medium.

In accordance with a further development of the present disclosure, the apparatus comprises a third port for the signal transmission of an electrical signal which interacts with the piston rods. The provision of a plurality of ports serves to increase the reliability of the cylinder piston position to be determined. The number of ports is accordingly not limited to two, but can adopt any desired large number. It is of advantage in this respect if a scattering parameter $S_{i,j}$, where $i \neq j$, that is a transmission factor, is used between two gates for determining the cylinder piston position.

The second port and/or the third port is/are formed by at least one electrical connector in the form of an electrode which interacts with the piston rod or is in contact therewith. Since each of the ports typically corresponds to a gate of the multi-gate measurement carried out by the unit for determining the position of the cylinder piston, a common mass level is used as the second port or second electrode belonging to the gate.

In accordance with a further development of the present disclosure, the piston rod bearing comprises two channel-shaped elements which each approximately have the basic shape of a half-ring in their cross-sections, and with each of them facing the concavely arched sides of the channel-shaped element of the piston rod. The piston rod is received in the two channel-shaped elements and is displaceably supported by them. The channel-shaped elements can also be considered as part-cylinder jacket surfaces which are obtained by a sectional plane extending in parallel with the longitudinal direction of the cylinder jacket.

The two channel-shaped elements receive the piston rod in their concave arches. In addition, a gap extending in the longitudinal direction of the piston rod is located between the mutually facing end faces of the two channel-shaped elements so that the two channel-shaped elements are not electrically connected or are not directly electrically connected to one another.

It is hereby ensured that a direct electrically conductive connection of the two ports only takes place via a connection extending over the piston rod and is not short-circuited by other elements such as the piston rod bearing.

In accordance with one embodiment, the first port is arranged at or in one of the two channel-shaped elements and the other port is arranged at or in the other one of the two channel-shaped elements.

The unit for determining the position of the cylinder piston can furthermore be configured, under the simplifying assumption that only TEM modes are taken into account in the hollow space between the piston rod and the inner wall of the cylinder liner, to determine the position of the cylinder piston with the help of the relationship $$e^{i\omega \frac{2L}{c}} = p_3 \left( \frac{p_2}{M - p_1} + 1 \right)$$

where $\omega$ is the angular speed, L the length of the piston rod in the hollow space, c the speed of light in the cylinder medium, $p_1$, $p_2$, $p_3$ are calibration parameters which can be determined via simulation or calibration and M is a signal measured at the ports. M is in this respect one of the transmission factors of the scattering parameters of the ports, for example $S_{21}$ or $S_{12}$. The calibration parameters $p_1$, $p_2$, $p_3$ can be determined via a simulation or a calibration.

As can be seen from the equation, an unambiguous piece of position information can be determined for any desired frequency up to multiples of the parameter $\lambda/2$.

The unit for the determination of the position of the cylinder piston advantageously comprises a vectorial network analyzer to determine the scattering parameters.

It is advantageous with the apparatus in accordance with the present disclosure that the position information can be acquired at any desired measurement frequency, that is also at the frequencies at which the impedance contribution of coupling elements is negligible.

The present information furthermore describes a method for the position determination of a cylinder piston, wherein a first port and a second port are each present for the signal transmission of an electrical signal from and to a piston rod. The method is characterized in that a multi-gate measurement is carried out for obtaining at least one scattering parameter, including one of the transmission factors $S_{21}$ or $S_{12}$, of the ports (4, 5) and the at least one detected scattering parameter is used for the determination of the cylinder piston position.

The present disclosure changes the manner of consideration of the cylinder system in accordance with which it becomes clear that the complete physical information can be found in the vectorial response of the system, that is both in the amplitude and in the phase of the measured signal. This circumstance is taken into account by the determination of at least one scattering parameter.

The method is further developed in that the first port is arranged in a fixed position with respect to a stroke movement of the cylinder piston, at a cylinder jacket in which the cylinder piston is received and the cylinder piston position is determined with respect to the first port arranged in a fixed position.

In accordance with a further modification of the method, the multi-gate measurement of the at least one scattering parameter of the ports is carried out with at least two mutually different measurement frequencies or measurement frequency ranges.

It is also of advantage to carry out the multi-gate measurement of the scattering parameters of the ports at a measurement frequency at which the impedance contribution of the ports or other coupling elements is minimal or negligible.

This allows a more exact position determination of the cylinder piston since the interference effects of the impedance of coupling elements can be reduced.

The position of the cylinder piston is determined on the basis of the relationship shown in the following under the simplifying assumption that only TEM modes are considered in the hollow space between the piston rod and the inner wall of the cylinder liner:

$$e^{i\omega \frac{2L}{c}} = p_3\left(\frac{p_2}{M-p_1}+1\right),$$

where ω is the angular speed, L the length of the piston rod in the hollow space, c the speed of light in the cylinder medium, $p_1$, $p_2$, $p_3$ are the calibration parameters which can be determined via simulation or calibration and M is a signal measured at the ports. M is in this respect one of the transmission factors of the scattering parameters of the ports, for example $S_{21}$ or $S_{12}$. The calibration parameters $p_1$, $p_2$, $p_3$ can be determined via a simulation or a calibration.

The present disclosure furthermore relates to a construction machine or to a hoisting unit having an apparatus of one of the above-described embodiments.

The present disclosure also comprises a construction machine or a hoisting unit having means which are configured to carry out one of the above-described methods in accordance with the present disclosure.

Further advantages and particulars of the present disclosure will be explained in detail in the following with reference to the embodiments shown in the drawings.

DETAILED DESCRIPTION

Figure 1:
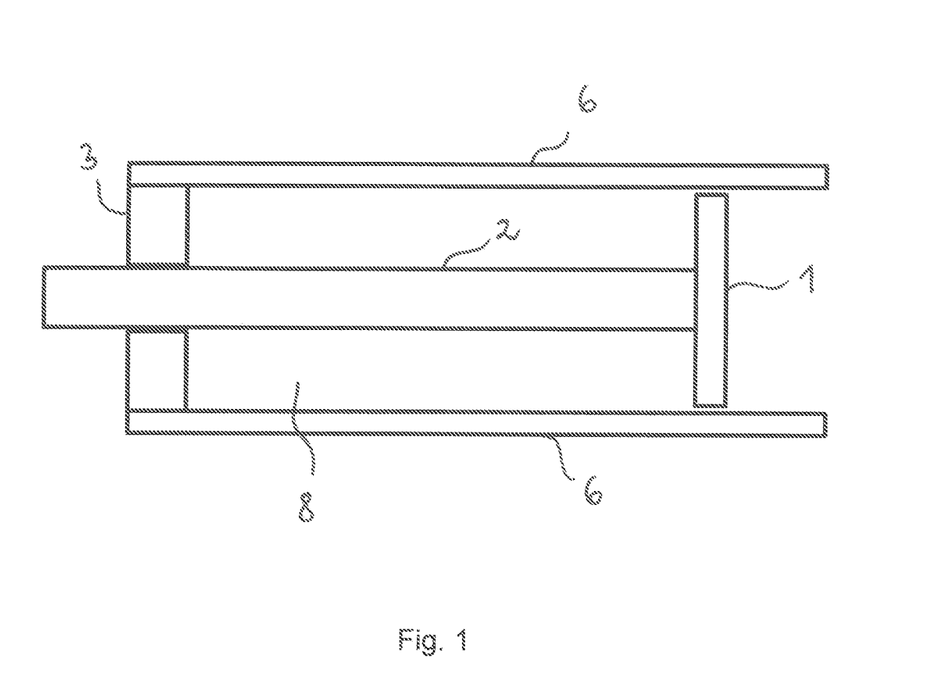
FIG. 1 shows a schematic diagram of a piston-in-cylinder unit.

FIG. 1 is a schematic representation of a cylinder piston 1 received in a cylinder liner 6. The cylinder piston 1 is in this respect fastened to an end of the cylinder piston rod 2 and is arranged movable to and fro in the cylinder liner 6. The piston rod 2 is held by a piston rod bearing 3 which allows a movement taking place in the axial direction of the cylinder liner 6. The cylinder piston 1 is typically adapted to the inner peripheral surface of the cylinder liner 6 such that they forms a fluid-tight connection. The gap shown in FIG. 1 between the cylinder piston 1 and the inner periphery of the cylinder liner 6 is due to the better presentability of the individual components. In addition, a hollow space 8 can be recognized between the piston rod 2 and the cylinder liner 6. This hollow space 8 can be used for the propagation of electromagnetic waves which allow a conclusion on the position of the piston 1 in the cylinder liner 6 on a corresponding measurement. The cylinder piston 1 shown in FIG. 1 and the rest of the figures herein may be installed in (and part of) a mobile work machine, such as a construction machine or hoisting unit (e.g., mobile work machine 500 shown in FIG. 5, as described further below). For example, the cylinder piston, or piston-in-cylinder unit, may actuate a piece of working equipment of the construction machine or hoisting unit.

Figure 2:
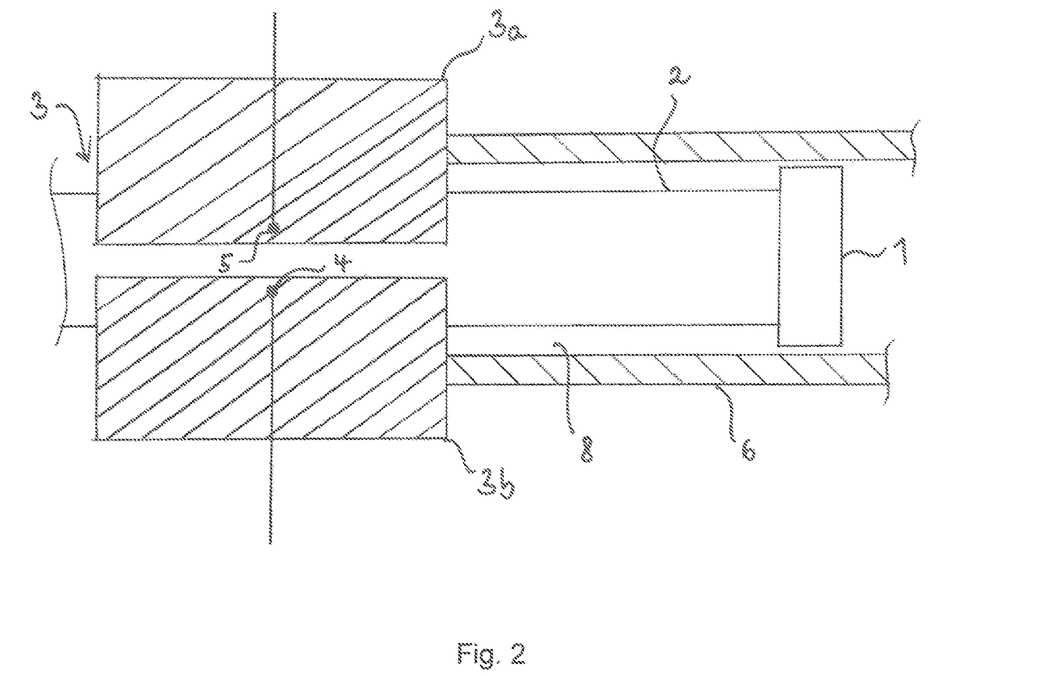
FIG. 2 shows a partial sectional view of an apparatus in accordance with the present disclosure.

FIG. 2 shows the apparatus in accordance with the present disclosure in a partial sectional view. The cylinder piston 1 arranged in the cylinder liner 6, the cylinder piston rod 2 and the piston rod bearing 3 arranged in a fixed position with respect to the cylinder liner 6 can again be recognized.

The piston rod bearing 3 in this embodiment comprises two elements 3a, 3b which are not in direct contact with one another and in or at which a respective port 4, 5 is provided for the transmission of an electrical signal. The first port 4 and also the second port 5 are in this respect arranged in different elements 3a, 3b of the piston rod bearing 3.

The first port 4 and/or the second port 5 is/are coupling elements in the embodiment shown and are configured to transmit an electrical signal to or receive an electrical signal from the piston rod bearing 3 in a capacitive, inductive or ohmic manner.

The two elements 3a, 3b of the piston rod bearing 3 in this respect typically have a channel-shaped recess in which the piston rod 2 is supported displaceably in its longitudinal axis. The piston rod bearing 3, which is arranged in a fixed position with respect to the piston rod 2, and is ports 4, 5 accordingly act on a corresponding axial section of the piston rod 2 depending on the position of the piston rod 2. This also has the result that the coupling of the electrical signals by the two ports 4, 5 takes place at different points of the piston rod 2 which are offset in the longitudinal direction.

Figure 3:
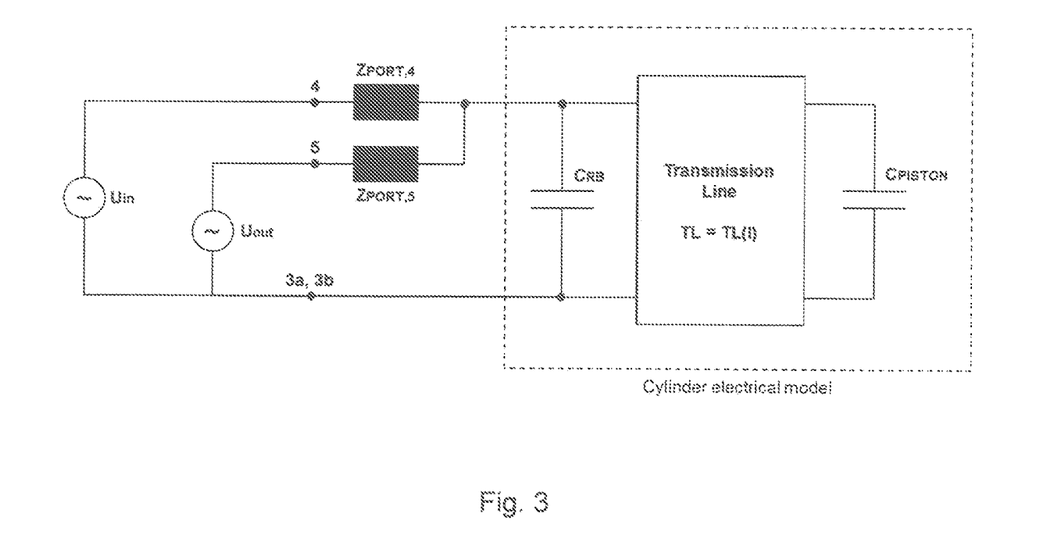
FIG. 3 shows an equivalent circuit diagram for the understanding of the apparatus in accordance with the present disclosure.

FIG. 3 is an equivalent circuit diagram of the apparatus in accordance with the present disclosure shown in FIG. 2. The two ports 4, 5 each form a gate with the associated element of the piston rod bearing 3a and 3b, respectively. The two ports 4, 5 each have an impedance value $Z_{PORT}$ associated with the port. In accordance with an advantageous embodiment, the two ports are of the same construction and therefore also have an identical impedance value $Z_{KON}$. The connection downstream of the two impedance values of the ports 4, 5 implemented by circuitry is implemented over the piston rod 2. An electrical connection of the two ports 4, 5 therefore takes place via the piston rod 2. The equivalent circuit diagram of a hydraulic cylinder model surrounded by a dashed line can furthermore also be recognized. The capacitance $C_{RB}$ formed by the piston rod bearing, the capacitance of the piston $C_{PISTON}$ and the transmission line TL(1) of the cylinder hollow space 8 dependent on the position of the cylinder piston 1 can be recognized. The capacitances are formed since the piston rod bearing 3 and the cylinder line 6 are arranged very close in position to the piston rod 2 or to the cylinder piston 1 and a capacitance thereby results.

The transmission line TL(1) between the piston rod bearing 3 and the cylinder piston 1 can be formed by a waveguide in the form of the hollow space 8.

The capacitances between the piston rod bearing and the piston are established since no electrically conductive connection is present between the cylinder liner 6 and the cylinder piston 1 or between the piston rod bearing 3 and the piston rod 2. The only exception in which an electrical signal can be transmitted into or out of the piston rod 2 is represented by the two ports 4, 5. The ports 4, 5 are in this respect electrically insulated from the piston rod bearing.

The unit, not shown in FIG. 3 (see unit 9 of FIG. 5), for determining the position of the cylinder piston 1 is configured to carry out a multi-gate measurement of the ports 4, 5 to detect at least one scattering parameter. The missing poles for forming the quadripole required for a two-gate measurement are marked as poles 3a, 3b in FIG. 3 and correspond to the two channel-shaped elements 4 of the piston rod bearing 3. It can be recognized that they represent a common reference level which can be implemented by contacting the piston rod bearing or the cylinder liner 6 in electrical contact therewith.

The circuit shown by means of example in FIG. 3 for determining the scattering parameter $S_{21}$ is acquired on the basis of the gates having the marking 4, 3b and 5, 3a. The impedance in this respect depends on the positioning of the cylinder piston 1 or on its position in the cylinder liner 6. It is therefore possible to acquire the position information of the cylinder piston 1 from a vectorial measurement of at least one scattering parameter.

Figure 4:
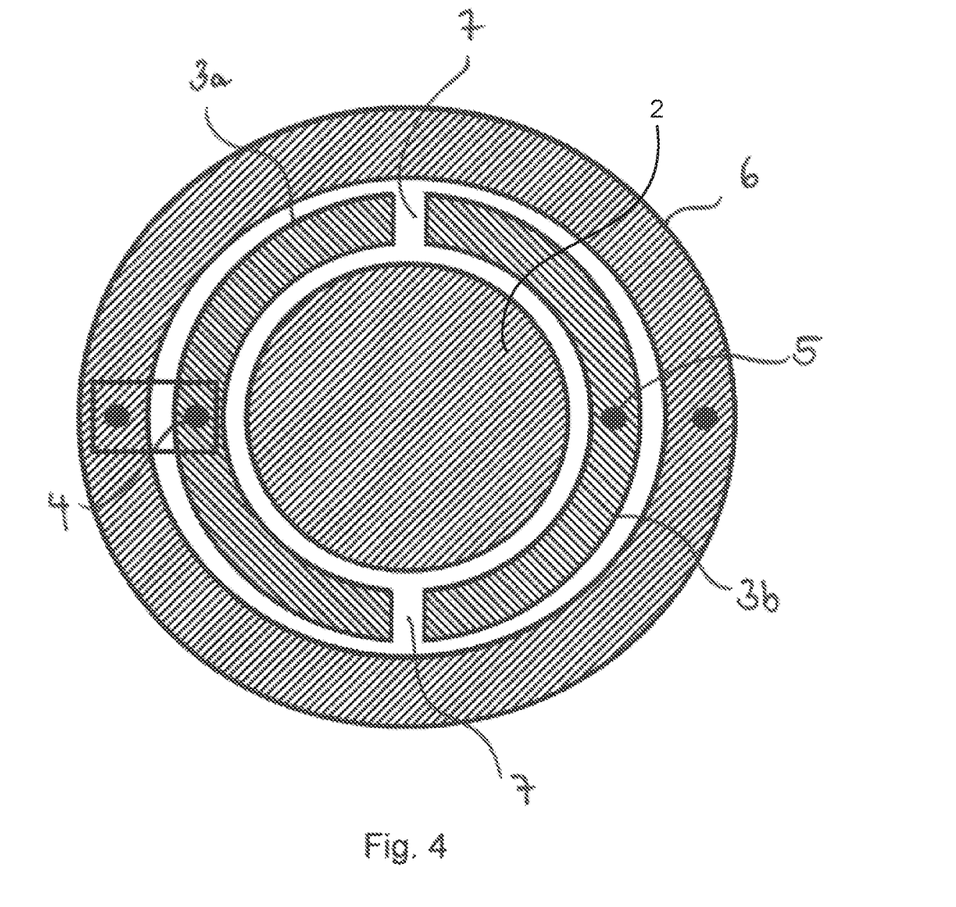
FIG. 4 shows a cross-sectional view of the apparatus in accordance with the present disclosure which shows the capacitive coupling to the piston rod.

FIG. 4 shows a cross-sectional view of the apparatus in accordance with the present disclosure at the level of the piston rod bearing. The piston rod 2, which is partially surrounded by two channel-like elements 3a, 3b, extends in the center. The channel-shaped elements 3a, 3b result in a support of the piston rod 2, but do not contact one another. A gap 7, which prevents a direction connection of the two elements 3a, 3b, is provided at the mutually facing end faces of the two channel-shaped elements 3a, 3b. The cylinder liner 6 is furthermore shown which surrounds both the piston rod 2 and the piston rod bearing 3. Each of the channel-shaped elements 3a, 3b of the piston rod bearing in this respect has a port 4, 5 which can transmit an electrical signal to or from the piston rod 2. The further points not provided with a reference numeral represent the further connectors for a dual gate measurement. They are arranged in accordance with the equivalent circuit diagram of FIG. 3 and represent the poles 3 and 4.

Figure 5:
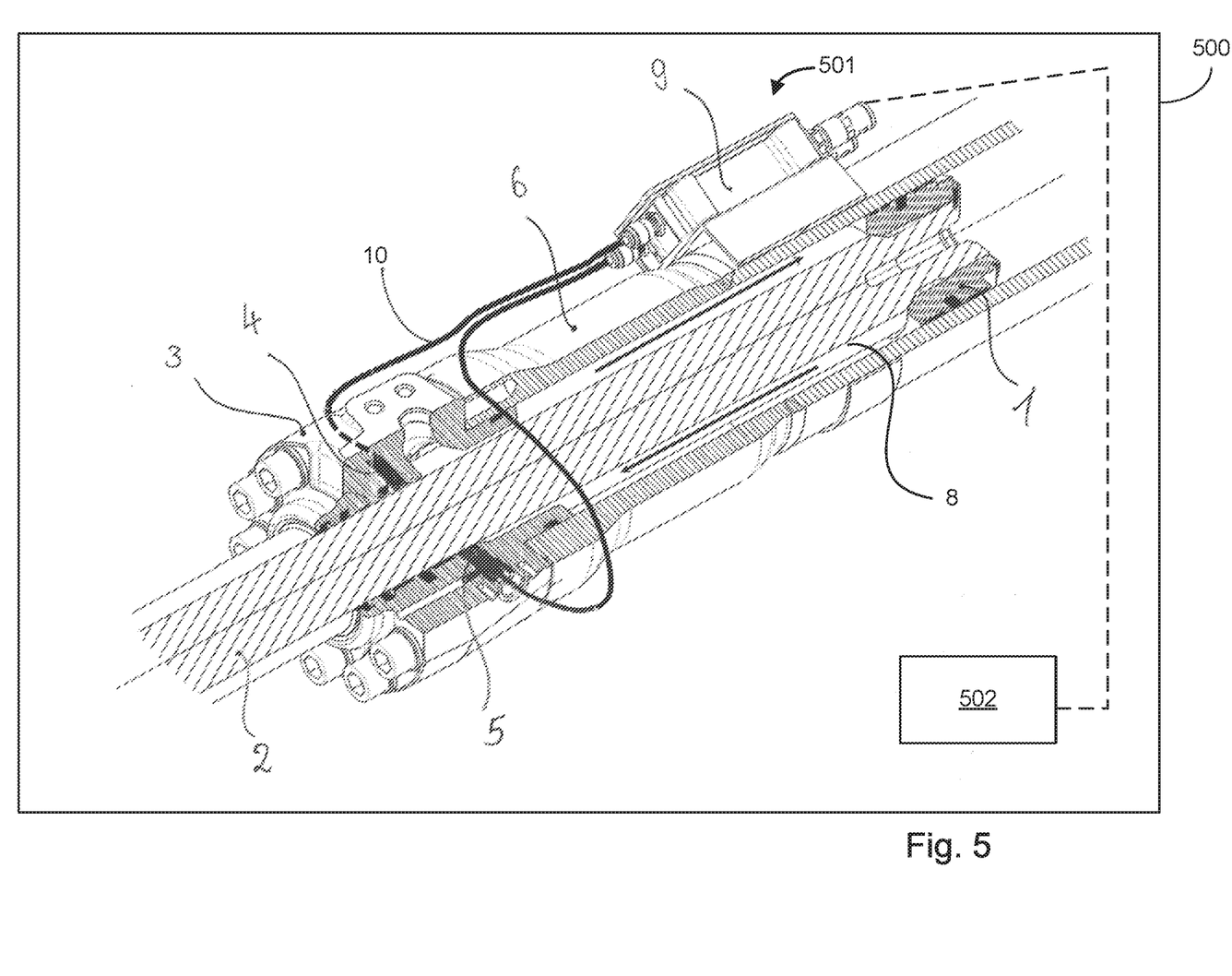
FIG. 5 shows a partly exposed perspective representation of the apparatus in accordance with the present disclosure.

FIG. 5 is a perspective representation of the apparatus in accordance with the present disclosure in a semi-transparent appearance for a better presentation of the relevant processes and components. Specifically, FIG. 5 shows the piston-in-cylinder unit 501, including cylinder piston 1, installed in a mobile work machine 500, such as a construction machine or hoisting unit. For example, the piston-in-cylinder unit 501 may actuate a piece of working equipment of the construction machine or hoisting unit. The mobile work machine includes a control system 502 for controlling operation of the mobile work machine. For example, the control system 502 may be communicatively coupled to various components of the mobile work machine to carry out the control routines and actions described herein. For example, the control system 502 may include an electronic digital controller which may be a microcomputer, including a microprocessor unit, input/output ports, an electronic storage medium for executable programs and calibration values, random access memory, keep alive memory, and a data bus. The controller may receive input from a plurality of sensors and communicate with various actuators of the mobile work machine 500 (e.g., such as the piston-in-cylinder unit 501). In some examples, the storage medium may be programmed with computer readable data representing instructions executable by the processor for performing the methods described below as well as other variants that are anticipated but not specifically listed.

The centrally extending piston rod 2 can be recognized which is received movably in its axial direction by the piston rod bearing 3. The piston rod 2 can therefore be moved into and out of the cylinder liner 6. A first port 4 and a second port 5 are likewise visible, each being configured to transmit an electrical signal from or to a unit 9 via a cable 10. The ports 4, 5 can furthermore be configured to carry out a signal transmission to the piston rod 2 or to pick up a signal from the piston rod. This contributes to the generation of the electromagnetic waves in the hollow space 8 between the piston rod 2 and the cylinder liner 6. For a better understanding, the electromagnetic waves in the hollow space 8 between the cylinder liner 6 and the piston rod 2 are marked by arrows. It can be seen that electromagnetic waves run from the first port in the direction of the piston 1 to couple in the electrical signals. Said waves are reflected at the piston and then move in the opposite direction away from the piston 1 and run toward the piston rod bearing 3. The second port 5 is also arranged there which is coupled to the modes of the wave capable of propagation.

The unit 9 is thereby able to detect at least one scattering parameter of the ports 4, 5 with the aid of a multi-gate measurement and to determine the position of the cylinder piston 1 on the basis of this at least one detected scattering parameter.

In this respect, the unit 9 for determining the position of the cylinder piston can comprise a vectorial network analyzer. In one embodiment, the gates in a dual gate measurement comprise the first port 4 and the reference level of the piston rod bearing or of the cylinder liner and the second port 5 and the reference level of the piston bar bearing or of the cylinder liner.

In one example, unit 9 may be an electronic unit including a microprocessor and storage medium (e.g., memory) including programs or instructions for carrying out the methods described herein for determining the position of the cylinder piston (such as method 600 described below with regard to FIG. 6). As explained above, the unit 9 may include a vectorial network analyzer. Further, the unit 9 may be in electronic communication with the control system 502 of the mobile work machine 500. As such, the determined position of the cylinder piston may be relayed to the control system (either wirelessly or via a wired connection between the control system and the unit 9) and used by the control system 502 for controlling the mobile work machine 500. Additionally, the control unit 502 may send signals to the piston-in-cylinder unit 501 for adjusting operation of the unit.

Figure 6:
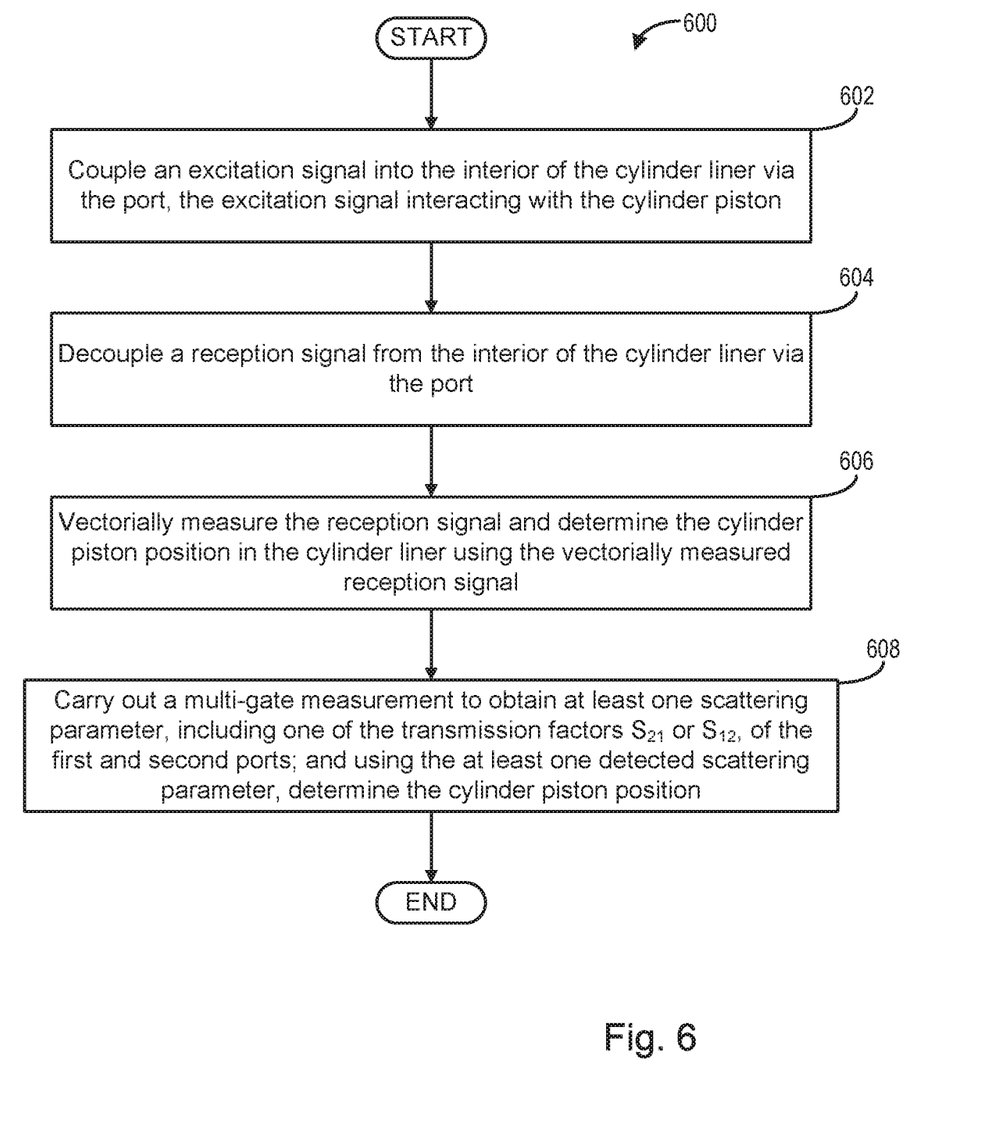
FIG. 6 shows a flow chart of a method for the position determination of a cylinder piston located in a cylinder liner in accordance with the present disclosure.

FIG. 6 shows a method 600 for the position determination of a cylinder piston located in a cylinder liner, where a port is provided for coupling an electrical signal into and for decoupling an electrical signal out of the interior of the cylinder liner. At 602, the method includes coupling an excitation signal into the interior of the cylinder liner via the port, the excitation signal interacting with the cylinder piston. At 604, the method includes decoupling a reception signal from the interior of the cylinder liner via the port. At 606, the method includes vectorially measuring the reception signal and determining the cylinder piston position in the cylinder liner using the vectorially measured reception signal. In one example, a first port is configured for coupling an electrical signal into the interior of a cylinder liner and a second port is configured for decoupling an electrical signal out of the interior of a cylinder liner; and a piston rod is furthermore present in the cylinder liner. At 608, the method further comprises carrying out a multi-gate measurement to obtain at least one scattering parameter, including one of the transmission factors $S_{21}$ or $S_{12}$, of the first and second ports; and using the at least one detected scattering parameter, determining the cylinder piston position. In one example, the measurement of the ports or the multi-gate measurement of the at least one scattering parameter of the ports is carried out at at least two mutually different measurement frequencies or measurement frequency ranges and is performed at a measurement frequency at which the impedance contribution of the port or ports is minimal or negligible. In another example, determining the position of the cylinder piston at 608 includes determining, under the simplifying assumption that only TEM modes are considered in the hollow space between the piston rod and the inner wall of the cylinder liner, on the basis of the relationship:

$$e^{i\omega\frac{2L}{c}} = p_3\left(\frac{p_2}{M-p_1}+1\right),$$

where
- ω is the angular speed;
- L is the length of the piston rod;
- c is the speed of light in the cylinder medium;
- $p_1$, $p_2$, $p_3$ are calibration parameters which can be determined via simulation or calibration; and
- M is a signal measured at the ports, one of the transmission factors $S_{21}$ or $S_{12}$ of the scattering parameters.

The invention claimed is:

1. An apparatus for position determination of a cylinder piston located in a cylinder liner, comprising:
    a port for coupling an electrical signal into or for decoupling an electrical signal out of an interior of the cylinder liner, wherein
        a signal coupled into the interior of the cylinder liner interacts with the cylinder piston; and
    a unit for determining the position of the cylinder piston which is connected to the port and which is configured to determine the position of the cylinder piston in the cylinder liner with the aid of a vectorial measurement of a signal decoupled from the cylinder liner.

2. The apparatus in accordance with claim 1, wherein
    a piston rod, which is connected at one of its ends to the cylinder piston, is present in the cylinder liner;
    a piston rod bearing is provided which is arranged at a section of the piston rod;
    the port comprises a first port, wherein the first port serves the coupling of the electrical signal into the interior of the cylinder liner, and a second port, the second port for decoupling the electrical signal from the interior of the cylinder liner; and
    the unit for determining the position of the cylinder piston is furthermore configured to detect at least one scattering parameter of the first and second ports, wherein the scattering parameter is a transmission factor, with the aid of a multi-gate measurement and to determine the cylinder piston position on the basis of the at least one detected scattering parameter.

3. The apparatus in accordance with claim 2, wherein the first port and the second port are arranged in a fixed position with respect to a stroke movement of the cylinder piston and of the piston rod, at or in the piston rod bearing.

4. The apparatus in accordance with claim 2, wherein one or more of the first port and the second port are coupling elements which allow a transmission of an electrical signal to the piston rod or from the piston rod in a capacitive, inductive and/or ohmic manner, and has at least one electrical connector comprising an electrode.

5. The apparatus in accordance with claim 2, wherein the unit for determining the position of the cylinder piston is configured to carry out the measurement of one of the first port or second port or the multi-gate measurement of the first and second ports for the determination of the at least one scattering parameter at at least two mutually different measurement frequencies or measurement frequency ranges and is carried out at a measurement frequency at which an impedance contribution of the port or ports is minimal or negligible.

6. The apparatus in accordance with claim 2, wherein the piston rod bearing comprises two channel-shaped elements which each have the basic shape of a half-ring in their cross-sections; and wherein respective concavely arched sides of the channel-shaped element face the piston rod.

7. The apparatus in accordance with claim 6, wherein the two channel-shaped elements receive the piston rod in their concave arches; and wherein a gap which extends in a longitudinal direction of the piston rod is present between mutually facing end faces of the two channel-shaped elements so that the two channel-shaped elements do not contact one another.

8. The apparatus in accordance with claim 6, wherein the first port is arranged at or in one of the two channel-shaped elements and the second port is arranged at or in the other one of the two channel-shaped elements.

9. The apparatus in accordance with claim 1, wherein the unit for determining the position of the cylinder piston is configured to determine the position of the cylinder piston with help of the relationship:

$$e^{i\omega\frac{2L}{c}} = p_3\left(\frac{p_2}{M-p_1}+1\right)$$

under the simplifying assumption that only TEM modes are considered in a hollow space between the piston rod and an inner wall of the cylinder liner, wherein
- ω is an angular speed;
- L is a length of the piston rod;
- c is a speed of light in a cylinder medium;
- $p_1$, $p_2$, $p_3$ are calibration parameters which can be determined via simulation or calibration; and
- M is a signal measured at the ports, including one of transmission factors $S_{21}$ or $S_{12}$ of scattering parameters.

10. The apparatus in accordance with claim 1, wherein the unit for determining the position of the cylinder piston comprises a vectorial network analyzer to determine scattering parameters.

11. A method for position determination of a cylinder piston located in a cylinder liner, wherein a port is provided for coupling an electrical signal into and for decoupling an electrical signal out of an interior of the cylinder liner, comprising:
    coupling an excitation signal into the interior of the cylinder liner via the port, the excitation signal interacting with the cylinder piston;
    decoupling a reception signal from the interior of the cylinder liner via the port; and
    vectorially measuring the reception signal and determining the cylinder piston position in the cylinder liner using the vectorially measured reception signal.

12. The method for the position determination of the cylinder piston in accordance with claim 11, wherein the port comprises a first port configured for coupling the electrical signal into the interior of the cylinder liner and a second port configured for decoupling the electrical signal out of the interior of the cylinder liner; and wherein a piston rod is furthermore present in the cylinder liner, the method further comprising,
    carrying out a multi-gate measurement to obtain at least one scattering parameter, including one of transmission factors $S_{21}$ or $S_{12}$ of the first and second ports; and using the at least one detected scattering parameter, determining the cylinder piston position.

13. The method in accordance with claim 12, wherein the measurement of the ports or the multi-gate measurement of the at least one scattering parameter of the ports is carried out at at least two mutually different measurement frequencies or measurement frequency ranges and is performed at a measurement frequency at which an impedance contribution of the port or ports is minimal or negligible.

14. The method in accordance with claim 11, wherein determining the position of the cylinder piston includes determining, under the simplifying assumption that only TEM modes are considered in a hollow space between the piston rod and an inner wall of the cylinder liner, on the basis of the relationship:

$$e^{i\omega\frac{2L}{c}} = p_3\left(\frac{p_2}{M-p_1}+1\right),$$

wherein $\omega$ is an angular speed;

L is a length of the piston rod;

c is a speed of light in a cylinder medium;

$p_1$, $p_2$, $p_3$ are calibration parameters which can be determined via simulation or calibration; and M is a signal measured at the ports, one of transmission factors $S_{21}$ or $S_{12}$ of scattering parameters.

15. A mobile work machine, comprising:

a cylinder piston located in a cylinder liner;

a first port for coupling an electrical signal into an interior of the cylinder liner, wherein the signal coupled into the interior of the cylinder liner interacts with the cylinder piston;

a second port for decoupling the electrical signal out of the interior of the cylinder liner; and a unit connected to the first and second ports and including computer executable instructions stored on a non-transitory computer readable medium instructions stored for:

determining a position of the cylinder piston in the cylinder liner with the aid of a vectorial measurement of the signal decoupled from the cylinder liner.

* * * * *